(12) United States Patent
Urabe (10) Patent No.: US 10,298,103 B2
(45) Date of Patent: May 21, 2019

(54) MANUFACTURING METHOD OF LAMINATED CORE AND MANUFACTURING DEVICE OF LAMINATED CORE

(71) Applicant: Mitsui High-tec, Inc., Yahatanishi-ku, Kitakyushu-shi, Fukuoka (JP)

(72) Inventor: Akihiro Urabe, Kitakyushu (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 312 days.

(21) Appl. No.: 15/433,250

(22) Filed: Feb. 15, 2017

(65) Prior Publication Data

US 2017/0237320 A1    Aug. 17, 2017

(30) Foreign Application Priority Data

Feb. 16, 2016 (JP) ................. 2016-026958

(51) Int. Cl.
*H02K 15/00* (2006.01)
*H02K 15/02* (2006.01)
*H02K 1/16* (2006.01)

(52) U.S. Cl.
CPC ............. *H02K 15/024* (2013.01); *H02K 1/16* (2013.01); *Y10T 29/49009* (2015.01)

(58) Field of Classification Search
CPC .... H02K 1/148; H02K 1/146; H02K 2201/15; H02K 21/16; Y10T 29/49009; Y10T 29/49078; Y10T 29/53143; Y10T 29/49012; Y10T 156/1056
USPC ......... 29/596, 602.1, 603.06, 604, 605, 606, 29/609, 732, 738
See application file for complete search history.

(56) References Cited

U.S. PATENT DOCUMENTS 6,369,687 B1 * 4/2002 Akita .................... H02K 1/148
                                                    310/216.011
9,099,897 B2 * 8/2015 Neuenschwander .......................
                                                    B23P 11/005

FOREIGN PATENT DOCUMENTS

JP      2003-235187 A    8/2003
JP         5719979 B1    5/2015
WO      2015111096 A1    7/2015

* cited by examiner

*Primary Examiner* — Thiem D Phan
(74) *Attorney, Agent, or Firm* — Procopio, Cory, Hargreaves & Savitch LLP

(57) ABSTRACT

A manufacturing method of a laminated core includes forming a first blanking member by blanking a band-shaped metal plate along a predetermined first blanking shape and forming a second blanking member by blanking the metal plate along a predetermined second blanking shape. The first blanking shape has a first-yoke corresponding region corresponding to a first yoke portion and a plurality of first-teeth corresponding regions corresponding to a plurality of first teeth portions. The second blanking shape has a second-yoke corresponding region corresponding to a second yoke portion and a plurality of second-teeth corresponding regions corresponding to a plurality of second teeth portions. The plurality of second-teeth corresponding regions are located between the plurality of first-teeth corresponding regions in a width direction one by one. The second teeth-corresponding region is located closer to one first-teeth corresponding region than a virtual straight line.

14 Claims, 10 Drawing Sheets

MANUFACTURING METHOD OF LAMINATED CORE AND MANUFACTURING DEVICE OF LAMINATED CORE

CROSS-REFERENCE TO RELATED APPLICATIONS

This application is based upon and claims the benefit of priority from Japanese Patent Application No. 2016-026958, filed Feb. 16, 2016, the entire contents of which are incorporated herein by reference.

BACKGROUND

1. Field

This disclosure relates to a manufacturing method of a laminated core and a manufacturing device of a laminated core.

2. Disclosure of the Related Art

Japanese Unexamined Patent Publication No. 2003-235187 and Japanese Patent No. 5719979 disclose a manufacturing method of a laminated core including a first process of forming a blanking member by blanking a metal plate by a punch while intermittently feeding a coil material from an uncoiler, the coil material being a band-shaped metal plate (workpiece plate wound in a coil state, a second process of forming a laminate by laminating a plurality of the blanking members, and a third process of forming a laminated core by processing the laminate. The blanking member formed in the first process has a yoke portion extending in a width direction of the metal plate and a plurality of teeth portions protruding from the yoke portion in a longitudinal direction of the metal plate and aligned in a single row at a predetermined interval in the width direction of the metal plate. In the first process, a pair of the blanking members is blanked by a punch so that the teeth portions of the blanking member is located between the teeth portions of the other blanking members.

SUMMARY

A manufacturing method of a laminated core according to an aspect of this disclosure includes: (a) forming a first blanking member by blanking a band-shaped metal plate along a predetermined first blanking shape, the first blanking member having a first yoke portion extending in a width direction of the metal plate and a plurality of first teeth portions protruding in a longitudinal direction of the metal plate from the first yoke portion and aligned in a single row at a predetermined interval in the width direction; and (b) forming a second blanking member by blanking the metal plate along a predetermined second blanking shape, the second blanking member having a second yoke portion extending in the width direction and a plurality of second teeth portions protruding in the longitudinal direction from the second yoke portion and aligned in a single row at a predetermined interval in the width direction. The first blanking shape has a first-yoke corresponding region corresponding to the first yoke portion and a plurality of first-teeth corresponding regions corresponding to the plurality of first teeth portions. The second blanking shape has a second-yoke corresponding region corresponding to the second yoke portion and a plurality of second-teeth corresponding regions corresponding to the plurality of second teeth portions. In step (b), the second blanking shape is set so that each one of the plurality of second-teeth corresponding regions is located between adjacent pairs of the plurality of first-teeth corresponding regions and the second teeth-corresponding region is located closer to one of the adjacent pairs of the plurality of first-teeth corresponding region than a virtual straight line, the virtual straight line extending in the longitudinal direction and passing between the one of the adjacent pairs of the plurality of first-teeth corresponding region and the other of the adjacent pairs of the plurality of first-teeth corresponding region.

A manufacturing device of a laminated core according to another aspect of this disclosure includes: a first punch portion forming a first blanking member by blanking a band-shaped metal plate along a predetermined first blanking shape, the first blanking member having a first yoke portion extending in the width direction of the metal plate and a plurality of first teeth portions protruding in the longitudinal direction of the metal plate from the first yoke portion and aligned in a single row at a predetermined interval in the width direction; and a second punch portion forming a second blanking member by blanking the metal plate along a predetermined second blanking shape, the second blanking member having a second yoke portion extending in the width direction and a plurality of second teeth portions protruding in the longitudinal direction from the second yoke portion and aligned in a single row at a predetermined interval in the width direction. The first blanking shape has a first-yoke corresponding region corresponding to the first yoke portion and a plurality of first-teeth corresponding regions corresponding to the plurality of first teeth portions. The second blanking shape has a second-yoke corresponding region corresponding to the second yoke portion and a plurality of second-teeth corresponding regions corresponding to the plurality of second teeth portions. The second blanking shape in the second punch portion is set so that each one of the plurality of second-teeth corresponding regions are located between adjacent pairs of the plurality of first-teeth corresponding regions, and the second teeth-corresponding region is located closer to one of the adjacent pairs of the plurality of first-teeth corresponding region than a virtual straight line, the virtual straight line extending in the longitudinal direction and passing between the one of the adjacent pairs of the plurality of first-teeth corresponding region and the other of the adjacent pairs of the plurality of first-teeth corresponding region.

DETAILED DESCRIPTION

An embodiment according to this disclosure described below is exemplification for description of the present invention and the present invention should not be limited to the contents below.

[1] Outline of Embodiment

A manufacturing method of a laminated core according to an example of this embodiment includes: (a) forming a first blanking member by blanking a band-shaped metal plate along a predetermined first blanking shape, the first blanking member having a first yoke portion extending in a width direction of the metal plate and a plurality of first teeth portions protruding in a longitudinal direction of the metal plate from the first yoke portion and aligned in a single row at a predetermined interval in the width direction; and (b) forming a second blanking member by blanking the metal plate along a predetermined second blanking shape, the second blanking member having a second yoke portion extending in the width direction and a plurality of second teeth portions protruding in the longitudinal direction from the second yoke portion aligned in a single row at a predetermined interval in the width direction. The first blanking shape has a first-yoke corresponding region corresponding to the first yoke portion and a plurality of first-teeth corresponding regions corresponding to the plurality of first teeth portions. The second blanking shape has a second-yoke corresponding region corresponding to the second yoke portion and a plurality of second-teeth corresponding regions corresponding to the plurality of second teeth portions. In step (b), the second blanking shape is set so that each one of the plurality of second-teeth corresponding regions are located between adjacent pairs of the plurality of first-teeth corresponding regions, and the second teeth-corresponding region is located closer to one of the adjacent pairs of the plurality of first-teeth corresponding region than a virtual straight line, the virtual straight line extending in the longitudinal direction and passing between the one of the adjacent pairs of the plurality of first-teeth corresponding region and the other of the adjacent pairs of the plurality of first-teeth corresponding region.

In the manufacturing method of a laminated core according to the one example of this embodiment, in step (b), the second blanking shape is set so that each one of the plurality of second-teeth corresponding regions are located between adjacent pair of the plurality of first-teeth corresponding regions, and the second teeth-corresponding region is located closer to one of the adjacent pairs of the plurality of first-teeth corresponding region than the virtual straight line. Thus, the first-teeth corresponding region and the second-teeth corresponding region are brought close to each other in the width direction. Therefore, as compared with the manufacturing methods in Patent Literatures 1 and 2 in which the second teeth-corresponding region is located on the virtual straight line, a narrower-width metal plate can be used, whereby a yield can be improved. As a result, a manufacturing cost of the laminated core can be reduced. Particularly, since an entire length of one coil material fed out of an uncoiler is approximately several 100 in to several 10000 in in some cases, a narrower-width metal plate can achieve improvement of the yield and cost reduction extremely effectively.

The manufacturing method of a laminated core according to the one example of this embodiment may include (c) forming a first through hole by blanking the metal plate along a predetermined third blanking shape before step (b), a pressing pin pressing the metal plate being inserted through the first through hole when the second blanking member is to be blanked from the metal plate in step (b), and the first through hole may be located between the other first-teeth corresponding region and the second-teeth corresponding region. In the manufacturing method of a laminated core according to the one aspect of this disclosure, the one first-teeth corresponding region and the second-teeth corresponding region are brought close to each other, while the other first-teeth corresponding region and the second-teeth corresponding region are separated away from each other. Thus, a margin region between the other first-teeth corresponding region and the second-teeth corresponding region becomes relatively large in the metal plate. Therefore, the first through hole through which the pressing pin pressing the metal plate is inserted when the second blanking member is to be blanked from the metal plate in step (b) can be set to the margin region. As a result, rattling of the metal plate can be suppressed, and the second blanking member can be formed accurately and stably.

The first through hole may be located closer to the other first-teeth corresponding region than the second-teeth corresponding region. In this case, the first through hole is located closer to the other first-teeth corresponding region after the first blanking member has been already blanked. Thus, a distance between the pressing pin inserted into the first through hole and the punch portion blanking the second blanking member increased. Therefore, since the metal plate is pressed reliably by the pressing pin, the second blanking member can be formed more accurately and stably.

A linear distance between the first through hole and the second-teeth corresponding region may be 1 mm or more.

A linear distance between the first through hole and the second-teeth corresponding region may be twice or more of a thickness of the metal plate.

The manufacturing method of a laminated core according to the one example of this embodiment may include (d) forming a second through hole by blanking the metal plate along a predetermined fourth blanking shape before step (a), a pressing pin pressing the metal plate being inserted through the second through hole when the first blanking member is to be blanked from the metal plate in the step (a), and in step (c), the first through holes may be formed more than the second through holes. As the blanking of the metal plate progresses, rigidity of the metal plate lowers, but if the number of the first through holes is larger than the number of second through holes, the pressing pin presses the metal plate through the first through hole in step (b) subsequent to step (a) and thus, rattling of the metal plate when the second blanking member is formed is further suppressed. Thus, the second blanking member can be formed more accurately and stably.

In step (c), the first through hole may be formed at a position aligned with the second through hole in the width direction and shifted from the second through hole in the longitudinal direction. In this case, the linear distance between the first through hole and the second blanked shape can be set larger more easily and the linear distance between the second through hole and the first blanked shape can be set larger more easily.

A manufacturing device of a laminated core according to another example of this embodiment includes: a first punch portion forming a first blanking member by blanking a band-shaped metal plate along a predetermined first blanking shape, the first blanking member having a first yoke portion extending in the width direction of the metal plate and a plurality of first teeth portions protruding in the longitudinal direction of the metal plate from the first yoke portion and aligned in a single row at a predetermined interval in the width direction; and a second punch portion forming a second blanking member by blanking the metal plate along a predetermined second blanking shape, the second blanking member having a second yoke portion extending in the width direction and a plurality of second teeth portions protruding in the longitudinal direction from the second yoke portion and aligned in a single row at a predetermined interval in the width direction. The first blanking shape has a first-yoke corresponding region corresponding to the first yoke portion and a plurality of first-teeth corresponding regions corresponding to the plurality of first teeth portions. The second blanking shape has a second-yoke corresponding region corresponding to the second yoke portion and a plurality of second-teeth corresponding regions corresponding to the plurality of second teeth portions. The second blanking shape in the second punch portion is set so that each one of the plurality of second-teeth corresponding regions are located between adjacent pairs of the plurality of first-teeth corresponding regions, and the second teeth-corresponding region is located closer to one of the adjacent pairs of the plurality of first-teeth corresponding region than a virtual straight line, the virtual straight line extending in the longitudinal direction and passing between the one of the adjacent pairs of the plurality of first-teeth corresponding region and the other of the plurality first-teeth corresponding region.

In the manufacturing device of a laminated core according to the other example of this embodiment, the second blanking shape in the second punch portion is set so that each one of the plurality of second-teeth corresponding regions are located between adjacent pairs of the plurality of first-teeth corresponding regions, and the second teeth-corresponding region is located closer to one of the adjacent pairs of the plurality of first-teeth corresponding region than the virtual straight line. Thus, the first-teeth corresponding region and the second-teeth corresponding region are brought close to each other in the width direction. Therefore, as compared with the manufacturing methods in Patent Literatures 1 and 2 in which the second teeth-corresponding region is located on the virtual straight line, a narrower-width metal plate can be used, whereby a yield can be improved. As a result, a manufacturing cost of the laminated core can be reduced. Particularly, since an entire length of one coil material fed out of an uncoiler is approximately several 100 m to several 10000 m in some cases, for example, a narrower-width metal plate can achieve improvement of the yield and cost reduction extremely effectively.

The manufacturing device of a laminated core according to the other example of this embodiment may further include a first pressing pin pressing the metal plate when the second blanking member is to be blanked by the second punch portion from the metal plate, and a third punch portion forming a first through hole by blanking the metal plate along a predetermined third blanking shape, the first pressing pin being inserted through the first through hole; and the third punch portion may form the first through hole so as to be located between the other first-teeth corresponding region and the second-teeth corresponding region. In the manufacturing device of a laminated core according to the other aspect of this disclosure, the one first-teeth corresponding region and the second-teeth corresponding region are brought close to each other, while the other first-teeth corresponding region and the second-teeth corresponding region are separated away from each other. Thus, a margin region between the other first-teeth corresponding region and the second-teeth corresponding region becomes relatively large in the metal plate. Therefore, the first through hole through which the first pressing pin pressing the metal plate is inserted when the second punch portion blanks the second blanking member from the metal plate can be set to the margin region. As a result, rattling of the metal plate can be suppressed, and the second blanking member can be formed accurately and stably.

The third punch portion may form the first through hole so as to be located closer to the other first-teeth corresponding region than the second-teeth corresponding region. In this case, the third punch portion forms the first through hole so as to be located closer to the other first-teeth corresponding region after the first blanking member has been already blanked. Thus, a distance between the first pressing pin inserted into the first through hole and the second punch portion blanking the second blanking member increased. Therefore, since the metal plate is pressed more reliably by the first pressing pin, the second blanking member can be formed more accurately and stably.

A linear distance between the first through hole and the second-teeth corresponding region may be 1 mm or more.

A linear distance between the first through hole and the second-teeth corresponding region may be twice or more of a thickness of the metal plate.

The manufacturing device of a laminated core according to the other example of this embodiment may further include a second pressing pin pressing the metal plate when the first punch portion blanks the first blanking member from the metal plate and a fourth punch portion forming a second through hole by blanking the metal plate along a predetermined fourth blanking shape, the second pressing pin being inserted through the second through hole, and the third punch portion may form the first through holes more than the second through holes formed by the fourth punch portion. As the blanking of the metal plate progresses, rigidity of the metal plate lowers, but if the number of the first through holes is larger than the number of the second through holes and if the second punch portion blanks the second blanking member while the first pressing pin presses the first through hole after the first punch portion blanks the first blanking member while the second pressing pin presses the second through hole, rattling of the metal plate when the second blanking member is formed is further suppressed. Thus, the second blanking member can be formed more accurately and stably.

The fourth punch portion may form the second through hole at a position aligned with the first through hole in the width direction and shifted from the first through hole in the longitudinal direction. In this case, the linear distance between the first through hole and the second blanked shape can be set larger more easily and the linear distance between the second through hole and the first blanked shape can be set larger more easily.

[2] Exemplification of Embodiment

An example of the embodiment according to this disclosure will be described below in more detail by referring to the attached drawings. In the following description, the same reference numerals are used for the same elements or the elements having the same functions, and duplicated description will be omitted.

[Laminated Stator Core]

Figure 1:
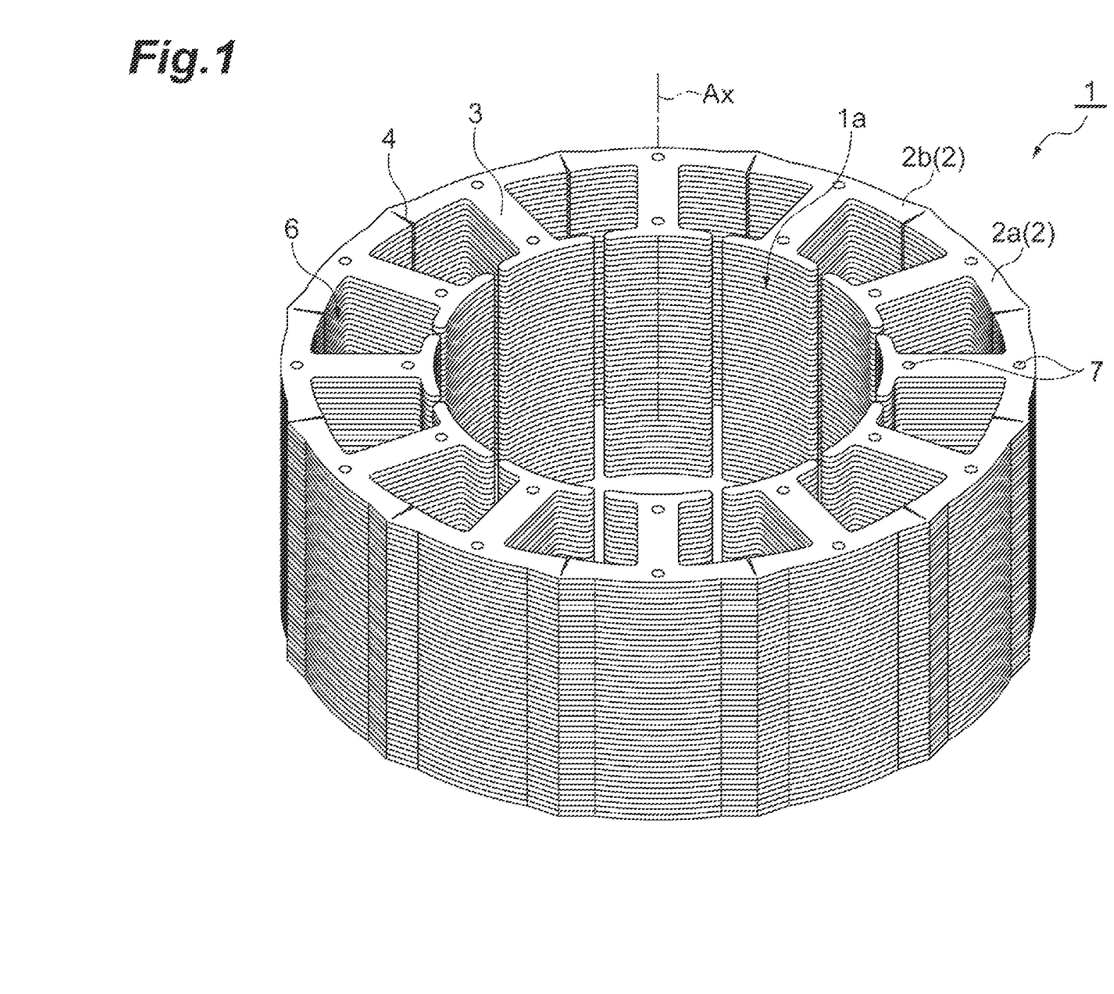
FIG. 1 is a perspective view illustrating a laminated stator core according to this embodiment.
Figure 2:
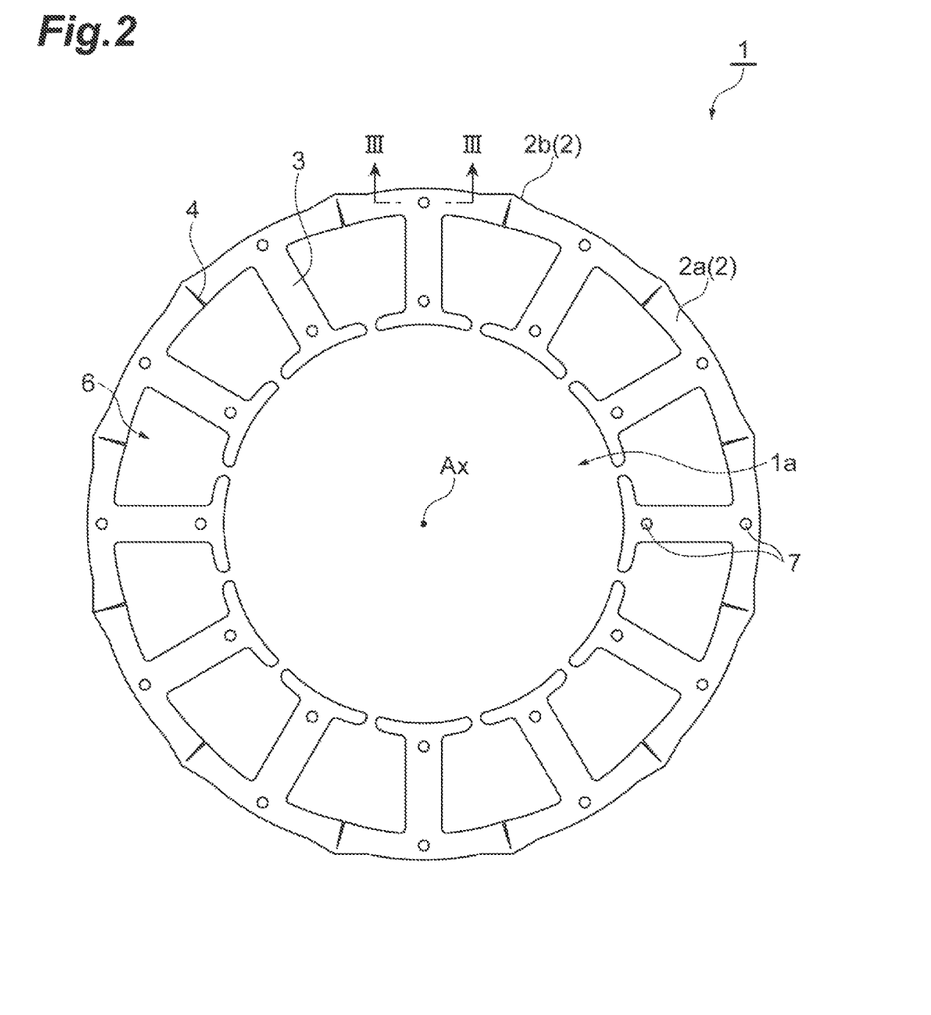
FIG. 2 is a plan view illustrating the laminated stator core in FIG. 1.
Figure 3:
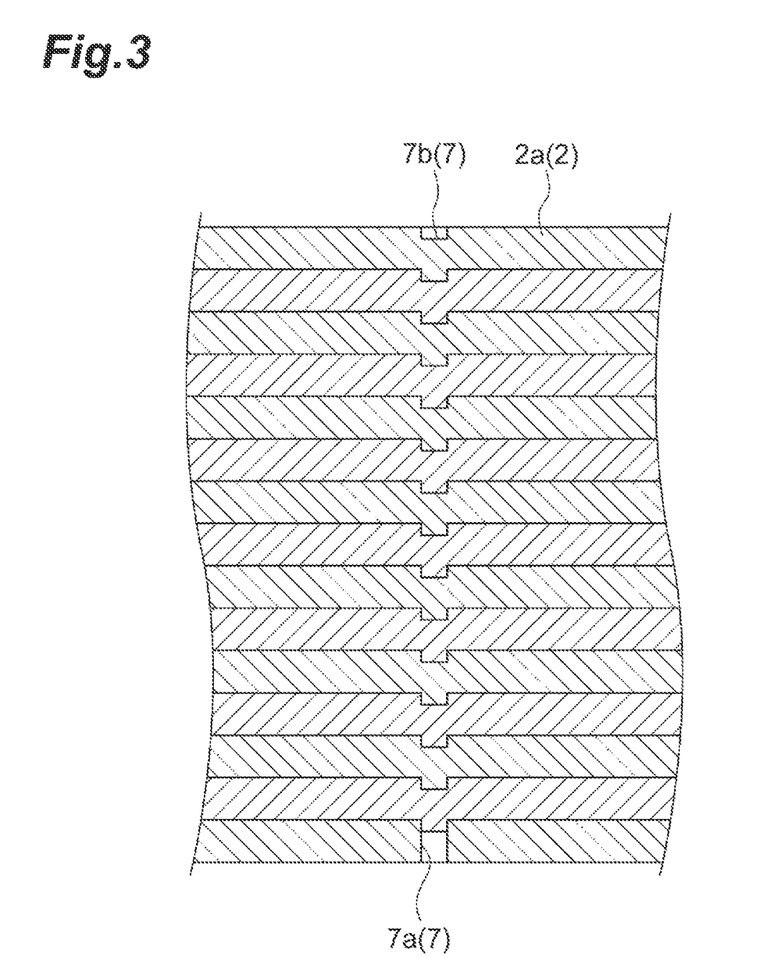
FIG. 3 is a III-III line sectional view of FIG. 2.

First, by referring to FIGS. 1 to 3, constitution of the laminated stator core 1 will be described. The laminated stator core 1 has a cylindrical shape. That is a through hole 1a extending along a center axis Ax is provided at a center portion of the laminated stator core 1. A rotor core (rotor), not shown, can be disposed in the through hole 1a. The laminated stator core 1 constitutes an electric motor together with the rotor core.

Figure 6:
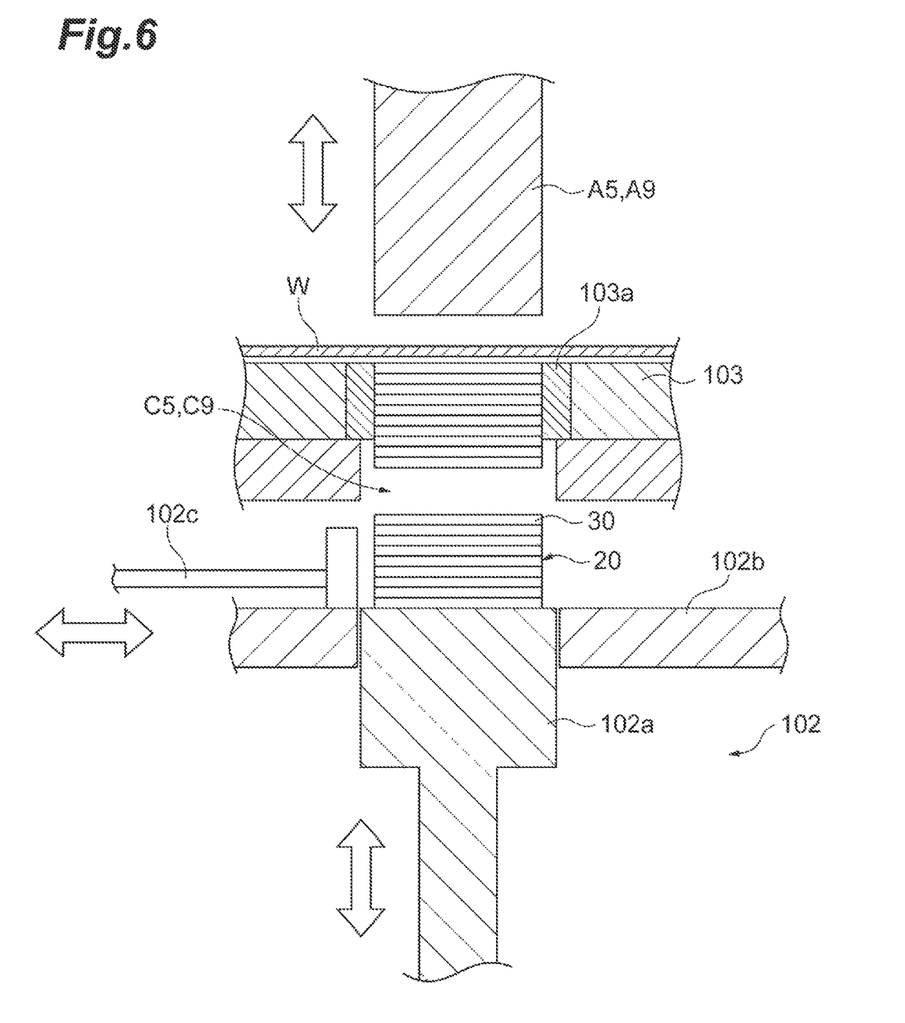
FIG. 6 is a sectional view schematically illustrating a mechanism for laminating blanking members and a mechanism for discharging a laminate from a metal mold.
Figure 9:
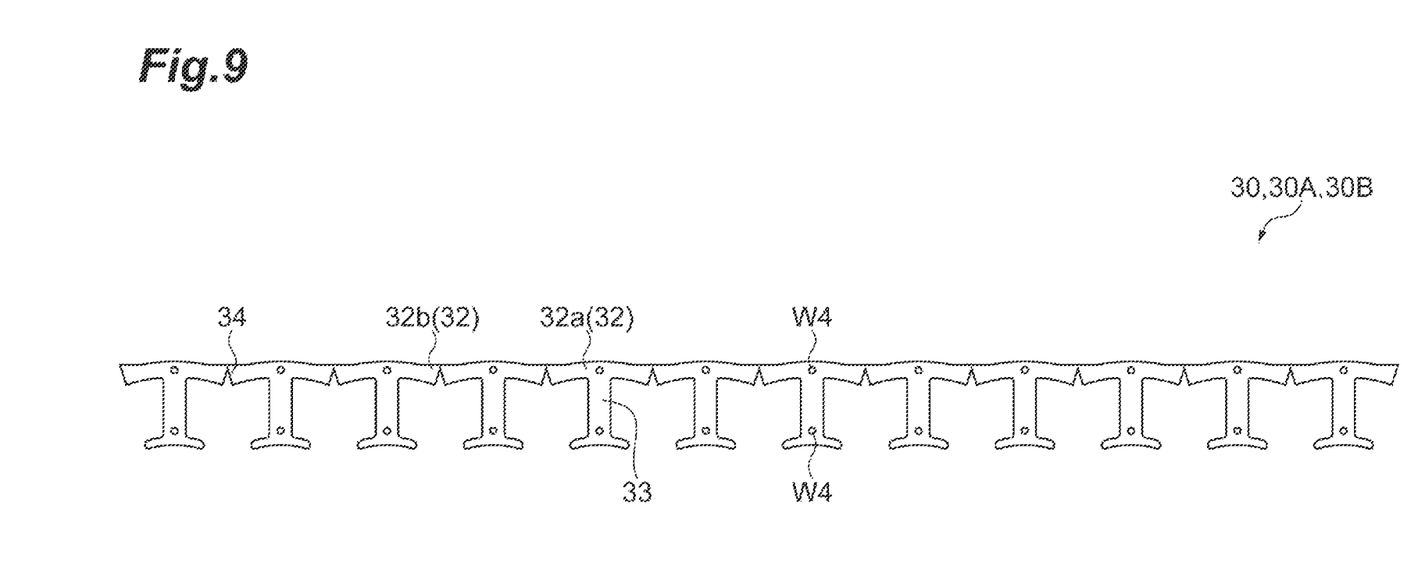
FIG. 9 is a plan view illustrating a blanking member.

The laminated stator core 1 constitutes a laminate 20 see FIG. 6) by laminating a plurality of blanking members 30 (see FIG. 9. Details will be described later.) and is obtained by processing the laminate 20. The laminated stator core 1 has one yoke portion 2 and a plurality of teeth portions 3 (twelve teeth portions 3 in FIGS. 1 and 2).

The yoke portion 2 has an annular shape and extends so as to surround the center axis Ax. A width of the yoke portion 2 in a radial direction can be various sizes depending on an application and a performance of the motor but it may be approximately 2 mm to 40 mm, for example. The yoke portion 2 includes a plurality of yokes 2a (twelve yokes 2a in FIGS. 1 and 2) and a plurality of connecting portions 2b (eleven connecting portions 2b in FIGS. 1 and 2).

The connecting portion 2b is located between the yokes 2a adjacent in a circumferential direction of the laminated stator core 1 and is located on an outer edge side of the yoke 2a. The connecting portion 2b integrally connects the yokes 2a adjacent in the circumferential direction of the laminated stator core 1. A notch portion 4 is formed on inner edge sides of the yokes 2a connected by the connecting portion 2b. A gap is present in the notch portion 4 in FIGS. 1 and 2, but side surfaces of the notch portion 4 may be in contact with each other.

Each of the teeth portions 3 extends from the inner edge of the corresponding yoke 2a toward the center axis Ax side along the radial direction of the laminated stator core 1. That is, the teeth portion 3 protrudes from the inner edge of the yoke portion 2 toward the center axis Ax side. In the laminated stator core 1 illustrated in FIGS. 1 and 2, one teeth portion 3 is integrally formed on one yoke 2a and constitutes one core piece 5. Therefore, the laminated stator core 1 illustrated in FIGS. 1 and 2 has 12 core pieces 5.

Each of the teeth portions 3 is aligned at a substantially equal interval in the circumferential direction of the laminated stator core 1. When the laminated stator core 1 is constituted as the motor, a winding wire (not shown) is wound a predetermined times around each of the teeth portions 3. A slot 6 is defined between the adjacent teeth portions 3 and is a space where the winding wire is disposed.

A swaged part 7 is provided on the yoke portions 2 and the teeth portions 3, respectively. The swaged part 7 has a through hole 7a formed in the blanking member 30 forming a lowermost layer of the laminated stator core 1 and a swaged area 7b formed in the blanking member 30 forming those other than the lowermost layer of the laminated stator core 1. The calking 7b is constituted by a recess part formed on a front surface side of the blanking member 30 and a projecting part formed on a back surface side of the blanking member 50. The recess part of the swaged area 7b of the one blanking member 30 is joined with the projecting part of the swaged area 7b of another blanking member 30 located on the front surface side of the one blanking member 30. The projecting part of the swaged area 7b of the one blanking member 30 is joined with the recess part of the swaged area 7b of further another blanking member 30 located on the back surface side of the one blanking member 30, the projecting part of the swaged area 7b of the blanking member 30 adjacent to the lowermost layer of the laminated stator core 1 is joined with the through hole 7a. The through hole 7a has a function of preventing fastening of the laminate 20 to be manufactured subsequently to the laminate 20 having been already manufactured by the swaged area 7b when the laminates 20 are to be continuously manufactured.

[Manufacturing Device of Laminated Stator Core]

Figure 4:
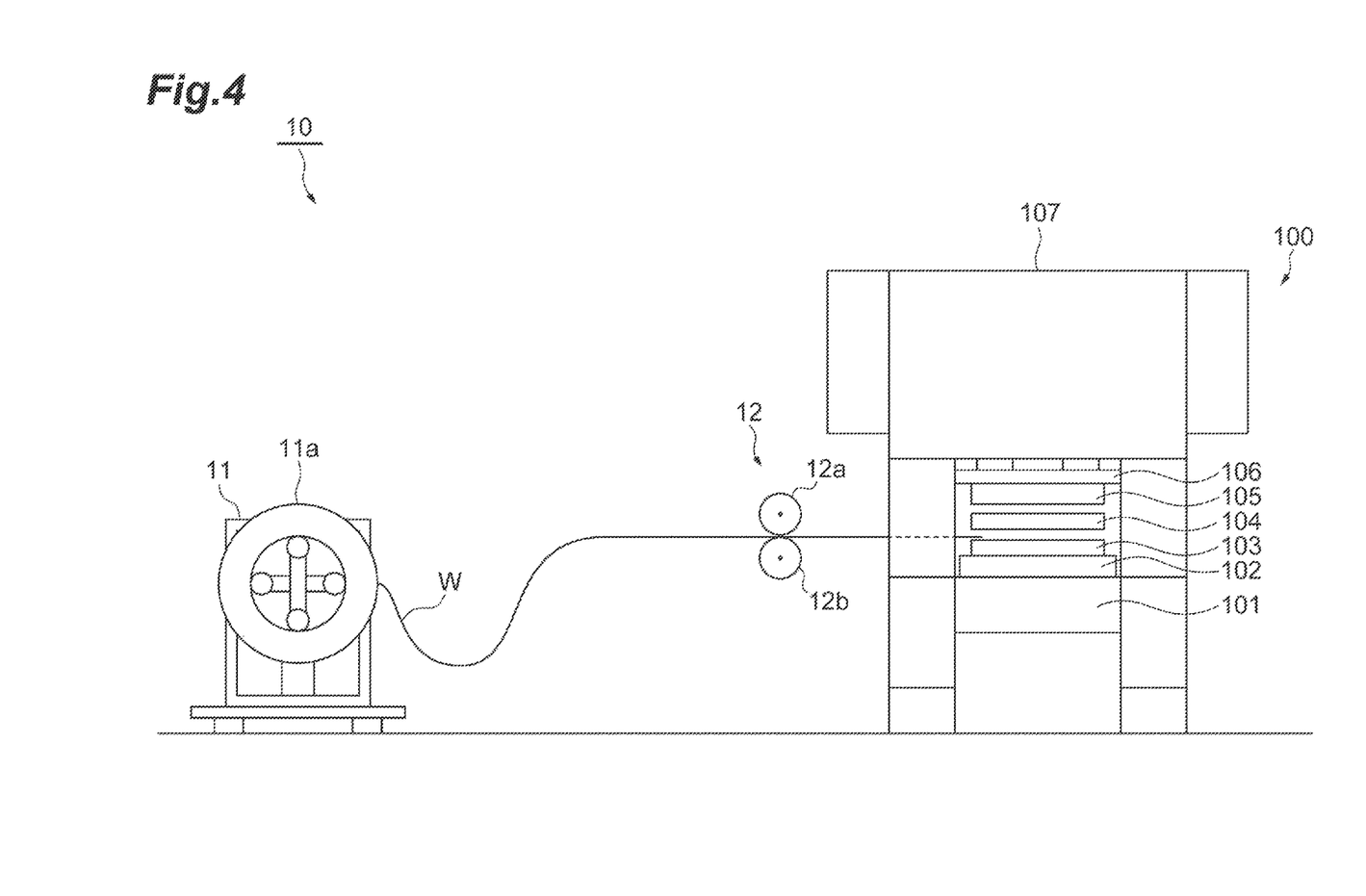
FIG. 4 is a schematic view illustrating an example of a manufacturing device of the laminated core.

Subsequently, a manufacturing device 10 of the laminated stator core 1 will be described by referring to FIG. 4. The manufacturing device 10 is a device for manufacturing the laminated stator core 1 from an electromagnetic steel sheet W (workpiece plate) which is a band-shaped metal plate. The manufacturing device 10 includes an uncoiler 11 to which a coil material 11a which is the band-shaped electromagnetic steel sheet W wound in a coil state is attached, a feeding device 12 for intermittently feeding out the electromagnetic steel sheet W, and a blanking device 100 for manufacturing the laminate 20 which becomes the laminated stator core 1 by blanking the blanking member 30 from the electromagnetic steel sheet W.

The uncoiler 11 rotatably holds the coil material 11a. A length of the electromagnetic steel sheet W constituting the coil material 11a may be approximately 500 m to 10000 m, for example. A thickness of the electromagnetic steel sheet W may be approximately 0.1 mm to 0.5 mm, for example. The thickness of the electromagnetic steel sheet W may be approximately 0.1 mm to 0.3 mm, for example, from a viewpoint of obtainment of the laminated stator core 1 having more excellent magnetic characteristics. A width of the electromagnetic steel sheet W may be approximately 50 mm to 500 mm, for example. The feeding device 12 has a pair of rollers 12a and 12b sandwiching the electromagnetic steel sheet W from above and below. The electromagnetic steel sheet W is introduced into the blanking device 100 through the feeding device 12.

[Blanking Device]

Subsequently, the blanking device 100 will be described by referring to FIGS. 5 and 6. The blanking device 100 has a function of forming the blanking member 30 by sequentially blanking the electromagnetic steel sheet W intermittently fed out by the feeding device 12, a function of forming the laminate 20 by sequentially laminating the blanking member 30 obtained by the blanking and a function of manufacturing the laminated stator core 1 by processing the laminate 20.

Figure 5:
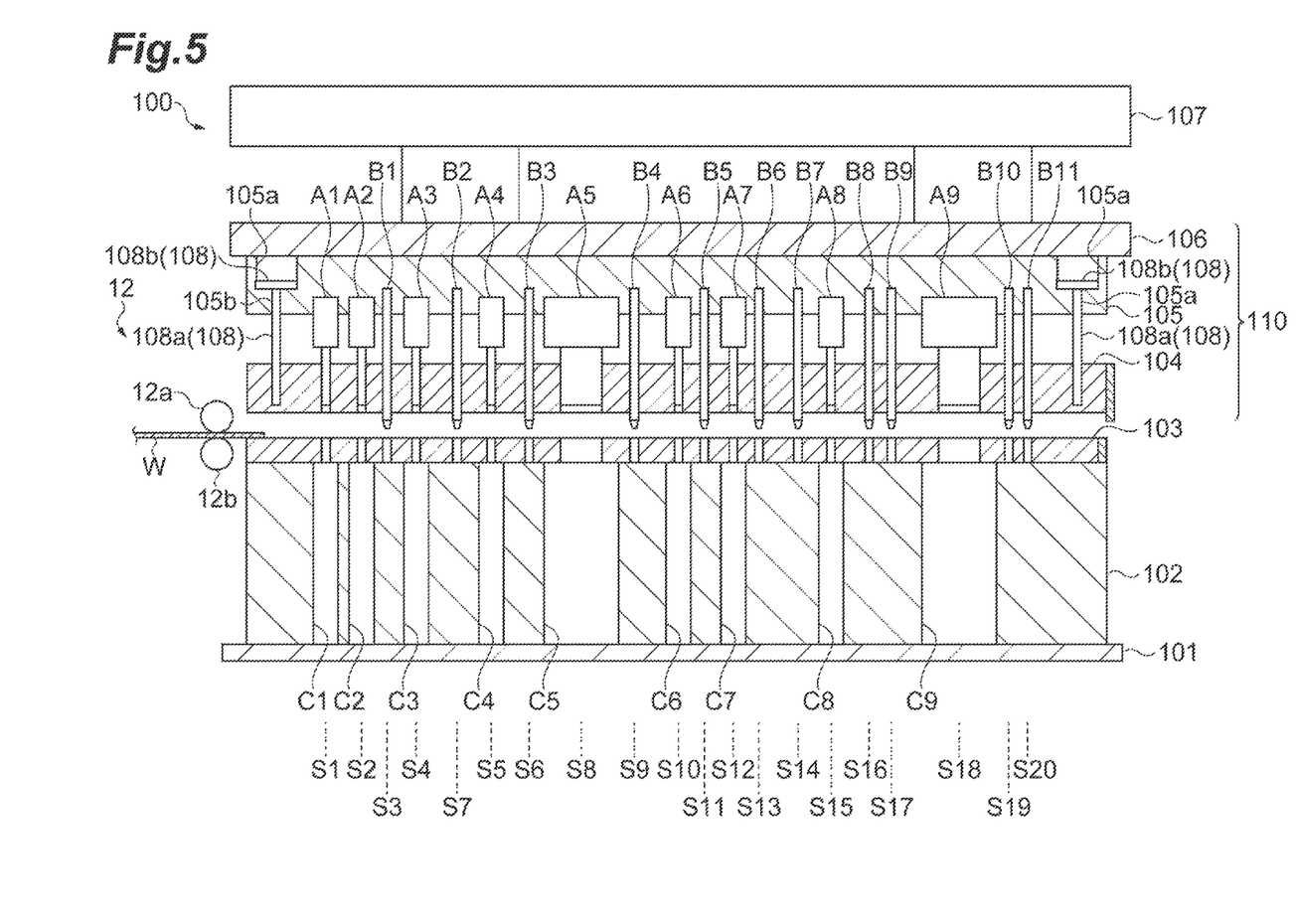
FIG. 5 is a schematic view illustrating an example of a blanking device.

The blanking device 100 has, as illustrated in FIG. 5, a base 101, a holding table 102, a metal mold 103, a stripper plate 104, a holding plate 105, a top plate 106, a press machine 107, suspending tools 108, punches A1 to A9, and pressing pins B1 to B11. The base 101 supports the holding table 102 placed on the base 101.

The holding table 102 holds the metal mold 103 placed on the holding table 102. On the holding table 102, discharge holes C1 to C9 are provided at positions corresponding to the punches A1 to A9, respectively, and a material blanked from the electromagnetic steel sheet W (the blanking member 30, a waste material and the like, for example) is discharged through the discharge holes C1 to C9. As illustrated in FIG. 6, a cylinder 102a constituted movably in a vertical direction, a stage 102b having a hole through which the cylinder 102a can pass provided therein, and a pusher 102c constituted movably in a horizontal direction on a surface of the stage 102b are disposed in the discharge holes C5 and C9.

The cylinder 102a supports the blanking member 30 so as to prevent the blanking member 30 blanked by the punches A5 and A9 from the electromagnetic steel sheet W from falling downward. The cylinder 102a intermittently moves downward each time the blanking member 30 is laminated on the cylinder 102a. When the blanking members 30 are laminated on the cylinder 102a to a predetermined number and the laminate 20 is formed, the cylinder 102a moves to a position where a surface of the cylinder 102a becomes the same height as the surface of the stage 102b. In this state, the pusher 102c is operated and drives the laminate 20 away from the cylinder 102a to the stage 102b. The laminate 20 having been driven away to the stage 102b is worked by a machine, not shown, whereby the laminated stator core 1 is manufactured.

Returning to FIG. 5, the metal mold 103 has a function of molding the blanking member 30 together with the punches A1 to A9. Dies 103a are provided at positions corresponding to the punches A1 to A9, respectively, in the metal mold 103. Each of the die 103a has a through hole extending in the vertical direction and communicating with each of the discharge holes C1 to C9. An inner diameter of the die 103a has such a size that a distal end portion of each of the punches A1 to A9 can be inserted and slightly smaller than the distal end portion.

Returning to FIG. 5, the stripper plate 104 has a function of removing the electromagnetic steel sheet W bitten in the punches A1 to A9 from the punches A1 to A9 when the electromagnetic steel sheet W is blanked by the punches A1 to A9. The stripper plate 104 is positioned above the metal mold 103. In the stripper plate 104, a through hole is provided at a position corresponding to each of the punches A1 to A9. Each of the through holes extends in the vertical direction and communicates with the through hole of each of the dies 103a when the stripper plate 104 comes into contact with the metal mold 103. The distal end portion of each of the punches A1 to A9 can be inserted into each of the through holes.

The holding plate 105 is positioned above the stripper plate 104. Base end portions (upper end portions) of the punches A1 to A9 and the pressing pins B1 to B11 are fixed to the holding plate 105. Thus, the holding plate 105 holds the punches A1 to A9 and the pressing pins B1 to B11. Accommodating space 105a positioned on the top plate 106 side and through holes 105b penetrating downward from each of the accommodating space 105a are provided in the holding plate 105.

The top plate 106 is positioned above the holding plate 105. The top plate 106 holds the holding plate 105. The press machine 107 is positioned above the top plate 106. A piston of the press machine 107 is connected to the top plate 106. When the press machine 107 is operated, the piston expands/contracts, and the stripper plate 104, the holding plate 105, the top plate 106, the suspending tools 108, the punches A1 to A9 and the pressing pins B1 to B11 (hereinafter they are called movable portions 110) are vertically moved entirely.

The suspending tool 108 holds the stripper plate 104 by suspending it from the holding plate 105. The suspending tool 108 has a lengthy rod portion 108a and a head portion 108b provided on an upper end of the rod portion 108a. A lower end portion of the rod portion 108a is fixed to the stripper plate 104. An upper end portion of the rod portion 108a is inserted into the through hole 105b of the holding plate 105. The head portion 108b has a diameter larger than that of the lower end portion and is accommodated in the accommodating space 105a of the holding plate 105. Thus, the head portion 108b is relatively movable vertically with respect to the holding plate 105 in the accommodating space 105a.

The punches A1 to A9 have a function of blanking the electromagnetic steel sheet W into a predetermined shape together with the metal mold 103 (dies 103a). Each of the punches A1 to A9 is disposed in this order so as to align from an upstream side (feeding device 12 side) toward a downstream side of the blanking device 100. The pressing pins B1 to B11 have a function of pressing the electromagnetic steel sheet W onto the metal mold 103 when the electromagnetic steel sheet W is blanked by the punches A1 to A9. Each of the pressing pins B1 to B11 is disposed in this order so as to align from the upstream side (feeding device 12 side) toward the downstream side of the blanking device 100.

[Manufacturing Method of Laminated Stator Core]

Subsequently, a manufacturing method of the laminated stator core 1 will be described by referring to FIGS. 5 to 9. When the electromagnetic steel sheet W is fed out by the feeding device 12 to the blanking device 100, and a portion to be worked of the electromagnetic steel sheet W reaches the punch A1, the press machine 107 is operated and pushes out the movable portion 110 downward toward the metal mold 103. After the stripper plate 104 reaches the metal mold 103, and the electromagnetic steel sheet W is sandwiched by them, the press machine 107 continuously pushes out the movable portion 110 downward. At this time, the stripper plate 104 does not move, but the distal end portions of the punches A1 to A9 and the pressing pins B1 to B11 move in the through holes of the stripper plate 104 and reach the corresponding through holes in the metal mold 103. Thus, the electromagnetic steel sheet W is blanked by the punch. A1 along a predetermined blanking shape, and a pair of through holes W1 is formed in the vicinity of both side edges of the electromagnetic steel sheet W (see a position S1 in FIGS. 5 and 7). The blanked waste material is discharged through the discharge hole C1 of the holding table 102. After that, the press machine 107 is operated and raises the movable portion 110.

Subsequently, when the electromagnetic steel sheet W is fed out by the feeding device 12, and the portion to be worked of the electromagnetic steel sheet W reaches the punch A2, an elevation operation of the movable portion 110 by the press machine 107 is carried out. As a result, the electromagnetic steel sheet W is blanked by the punch A2 (fourth punch portion) along the predetermined blanking shape (fourth blanking shape), and a pair of through holes W2 (second through holes) is formed at a center part of the electromagnetic steel sheet W (see a position 52 in FIGS. 5 and 7). The blanked waste material is discharged through the discharge hole C2 of the holding table 102. At the blanking of the electromagnetic steel sheet W by the punch A2, the pressing pin B1 is inserted into the through holes W1 (see a position S3 in FIGS. 5 and 7).

Subsequently, when the electromagnetic steel sheet W is fed out by the feeding device 12, and the portion to be worked of the electromagnetic steel sheet W reaches the punch A3, the elevation operation of the movable portion 110 by the press machine 107 is carried out. As a result, the electromagnetic steel sheet W is blanked by the punch A3 (first punch portion) and eleven through holes W3 aligned in a single row in the width direction of the electromagnetic steel sheet W are formed. (see a position S4 in FIGS. 5 and 7). The through hole W3 presents a wedge shape which is sharp on a downstream side and is wide on an upstream side of the electromagnetic steel sheet W. The through hole W3 corresponds to the notch portion 4 of the laminated stator core 1. The blanked waste material is discharged through the discharge hole C3 of the holding table 102.

Subsequently, when the electromagnetic steel sheet W is fed out by the feeding device 12, and the portion to be worked of the electromagnetic steel sheet W reaches the punch A4, the elevation operation of the movable portion 110 by the press machine 107 is carried out. As a result, the electromagnetic steel sheet W is worked by the punch A4, and twelve pairs of worked portions W4 aligned in a single row in a longitudinal direction of the electromagnetic steel sheet W are formed in the width direction of the electromagnetic steel sheet W (see a position 55 in FIGS. 5 and 7). The worked portions W4 are a through hole or a half-blanked projecting/recess portion. If the worked portion W4 is a through hole, the worked portion W4 corresponds to the through hole 7a of the swaged part 7. If the worked portion W4 is a through hole, the blanked waste material is discharged through the discharge hole C4 of the holding table 102. If the worked portion W4 is a half-blanked projecting/recess portion, the worked portion W4 corresponds to the swaged area 7b of the swaged part 7. In the case of machining of the electromagnetic steel sheet W by the punch A4, the pressing pin B3 is inserted into the through hole W1 (see a position S6 in FIGS. 5 and 7).

Subsequently, when the electromagnetic steel sheet W is fed out by the feeding device 12, and the portion to be worked of the electromagnetic steel sheet W reaches the punch A5, the elevation operation of the movable portion 110 by the press machine 107 is carried out. As a result, the electromagnetic steel sheet W is blanked by the punch A5 (first punch portion) along a predetermined blanking shape R1 (first blanking shape), and the blanking member 30 having a shape corresponding to the blanking shape R1 is formed (see a position S8 in FIGS. 5 and 7). In the following, the blanking member 30 having the shape corresponding to the blanking shape R1 is called a "blanking member 30A" (first blanking member). At the blanking of the electromagnetic steel sheet W by the punch. A5, the pressing pin B4 is inserted into the through hole W1 (see a position S9 in FIGS. 5 and 7), and the pressing pin B2 (second pressing pin) is inserted into the through hole W2 (see a position S7 in FIGS. 5 and 7).

The blanking member 30 has a yoke portion 32 and a plurality of teeth portions 33 (twelve teeth portions 33 in FIG. 9) as illustrated in FIG. 9. The yoke portion 32 extends in the width direction of the electromagnetic steel sheet W. The yoke portion 32 includes a plurality of yokes 32a (twelve yokes 32a in FIG. 9) and a plurality of connecting portions 32b (eleven connecting portions 32b in FIG. 9).

The connecting portion 32b is located between the adjacent yokes 32a in the width direction of the electromagnetic steel sheet W and is also located on an outer edge side (side opposite to the teeth portion 33) of the yoke 32a. The connecting portion 32b integrally connects the adjacent yokes 32a to each other in the width direction of the electromagnetic steel sheet W. A notch portion 34 is formed on an inner edge side of each of the yokes 32a connected by the connecting portion 32b. The notch portion 34 corresponds to a shape of the through hole W3.

Each of the teeth portions 33 protrudes from the yoke portion 32 to the longitudinal direction of the electromagnetic steel sheet W and the teeth portions 33 are aligned in a single row at a predetermined interval in the width direction of the electromagnetic steel sheet W. The worked portion W4 is formed, respectively, in the yoke portion 32 and the teeth portion 33.

The blanking member 30A is laminated in the discharge hole C5 of the holding table 102 (see FIG. 6). When the blanking members 30A are laminated to a predetermined number and the laminate 20 is formed, the laminate 20 is driven away from the cylinder 102a to the stage 102b by the pusher 102c and is fed out to a working machine. At the working machine, processing of bending the laminate 20 at each of the notch portions 34 so that the yoke portion 32 has an annular shape and processing of joining the both ends of the yoke portion 32 to each other by welding are carried out. As a result, the laminated stator core 1 is manufactured.

Subsequently, when the electromagnetic steel sheet W is fed out by the feeding device 12, and the portion to be worked of the electromagnetic steel sheet W reaches the punch A6, the elevation operation of the movable portion 110 by the press machine 107 is carried out. As a result, the electromagnetic steel sheet W is blanked by the punch A6 (third punch portion) along a predetermined blanking shape (third blanking shape), and four through holes W5 (first through holes) aligned in a single row in the width direction of the electromagnetic steel sheet W are formed (see a position S10 in FIGS. 5 and 7). That is, in this embodiment, the number of the through holes W5 is set larger than the number of through holes W2. The blanked waste material is discharged through the discharge hole C6 of the holding table 102. At the blanking of the electromagnetic steel sheet W by the punch A6, the pressing pin B5 is inserted into the through hole W2 (see a position S11 in FIGS. 5 and 7).

Subsequently, when the electromagnetic steel sheet W is fed out by the feeding device 12, and the portion to be worked of the electromagnetic steel sheet W reaches the punch A7, the elevation operation of the movable portion 110 by the press machine 107 is carried out. As a result, the electromagnetic steel sheet W is blanked by the punch A7 (second punch portion), and eleven through holes W6 aligned in a single row in the width direction of the electromagnetic steel sheet W are formed (see a position S12 in FIGS. 5 and 7). The through hole W6 presents a wedge shape which is sharp on the upstream side and is wide on the downstream side of the electromagnetic steel sheet W. The through hole W6 corresponds to the notch portion 4 of the laminated stator core 1. The blanked waste material is discharged through the discharge hole C7 of the holding table 102. At the blanking of the electromagnetic steel sheet W by the punch A7, the pressing pin B6 is inserted into the through hole W5 (see a position S13 in FIGS. 5 and 7).

Subsequently, when the electromagnetic steel sheet W is fed out by the feeding device 12, and the portion to be worked of the electromagnetic steel sheet W reaches the punch. A8, the elevation operation of the movable portion 110 by the press machine 107 is carried out. As a result, the electromagnetic steel sheet W is worked by the punch A8, and twelve pairs of worked portions W7 aligned in a single row in a longitudinal direction of the electromagnetic steel sheet W are formed in the width direction of the electromagnetic steel sheet W (see a position S15 in FIGS. 5 and 7). The worked portions W7 are a through hole or a half-blanked projecting/recess portion. If the worked portion W7 is a through hole, the worked portion W7 corresponds to the through hole 7a of the swaged part 7. If the worked portion W7 is a through hole, the blanked waste material is discharged through the discharge hole C8 of the holding table 102. If the worked portion W7 is a half-blanked projecting/recess portion, the worked portion W7 corresponds to the swaged area 7b of the swaged part 7. In the case of machining of the electromagnetic steel sheet W by the punch A8, the pressing pin 137 is inserted into the through hole W1 (see a position S14 in FIGS. 5 and 7), and the pressing pin B8 is inserted into the through hole W5 (see a position S16 in FIGS. 5 and 7).

Subsequently, when the electromagnetic steel sheet W is fed out by the feeding device 12, and the portion to be worked of the electromagnetic steel sheet W reaches the punch A9, the elevation operation of the movable portion 110 by the press machine 107 is carried out. As a result, the electromagnetic steel sheet W is blanked by the punch A9 (second punch portion) along a predetermined blanking shape R2 (second blanking shape), and the blanking member 30 having a shape corresponding to the blanking shape R2 is formed (see a position S18 in FIGS. 5 and 7). In the following, the blanking member 30 having the shape corresponding to the blanking shape R2 is called a "blanking member 30B" (second blanking member). At the blanking of the electromagnetic steel sheet W by the punch A9, the pressing pins B9 and B11 are inserted into the through hole W1 (see positions S17 and S20 in FIGS. 5 and 7), respectively, and the pressing pin B10 (first pressing pin) is inserted into the through hole W5 (see a position S19 in FIGS. 5 and 7).

The blanking member 30B is laminated in the discharge hole C9 of the holding table 102 (see FIG. 6). When the blanking members 30B are laminated to a predetermined number and the laminate 20 is formed, the laminate 20 is driven away from the cylinder 102a to the stage 102b by the pusher 102c and is fed out to the working machine. At the working machine, the processing of bending the laminate 20 at each of the notch portions 34 so that the yoke portion 32 has an annular shape and processing of joining the both ends of the yoke portion 32 to each other by welding are carried out. As a result, the laminated stator core 1 is manufactured.

Figure 7:
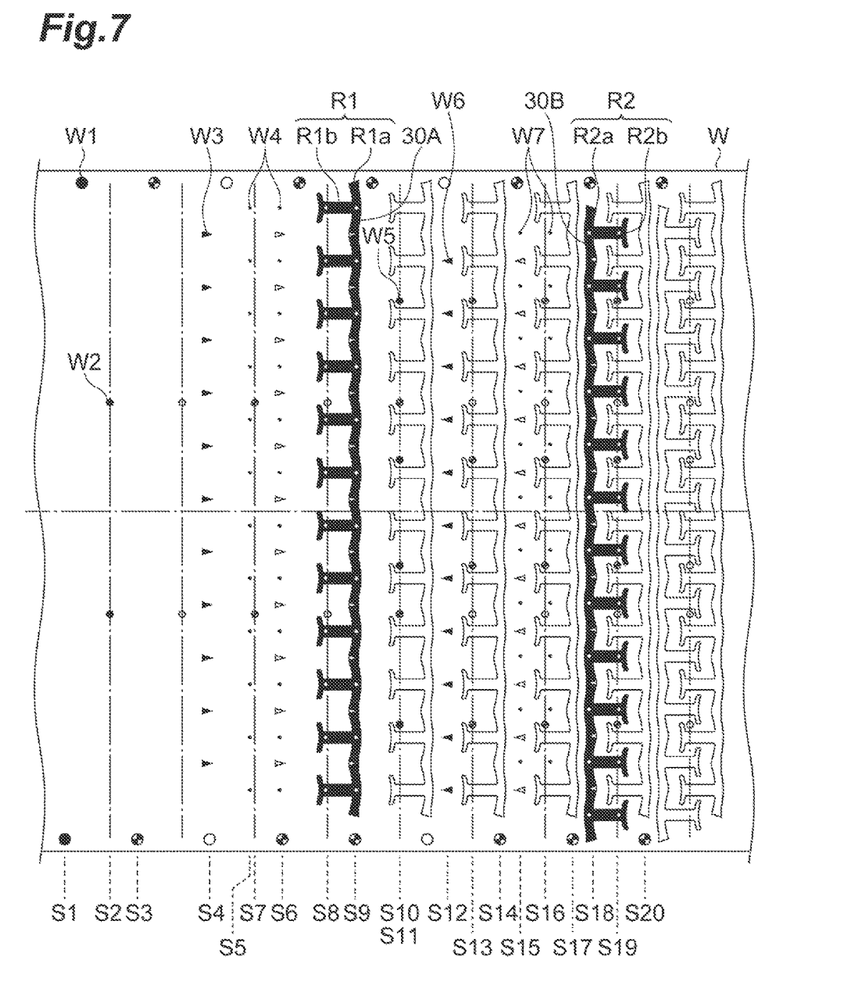
FIG. 7 is a diagram illustrating an example of a layout of blanking.
Figure 8:
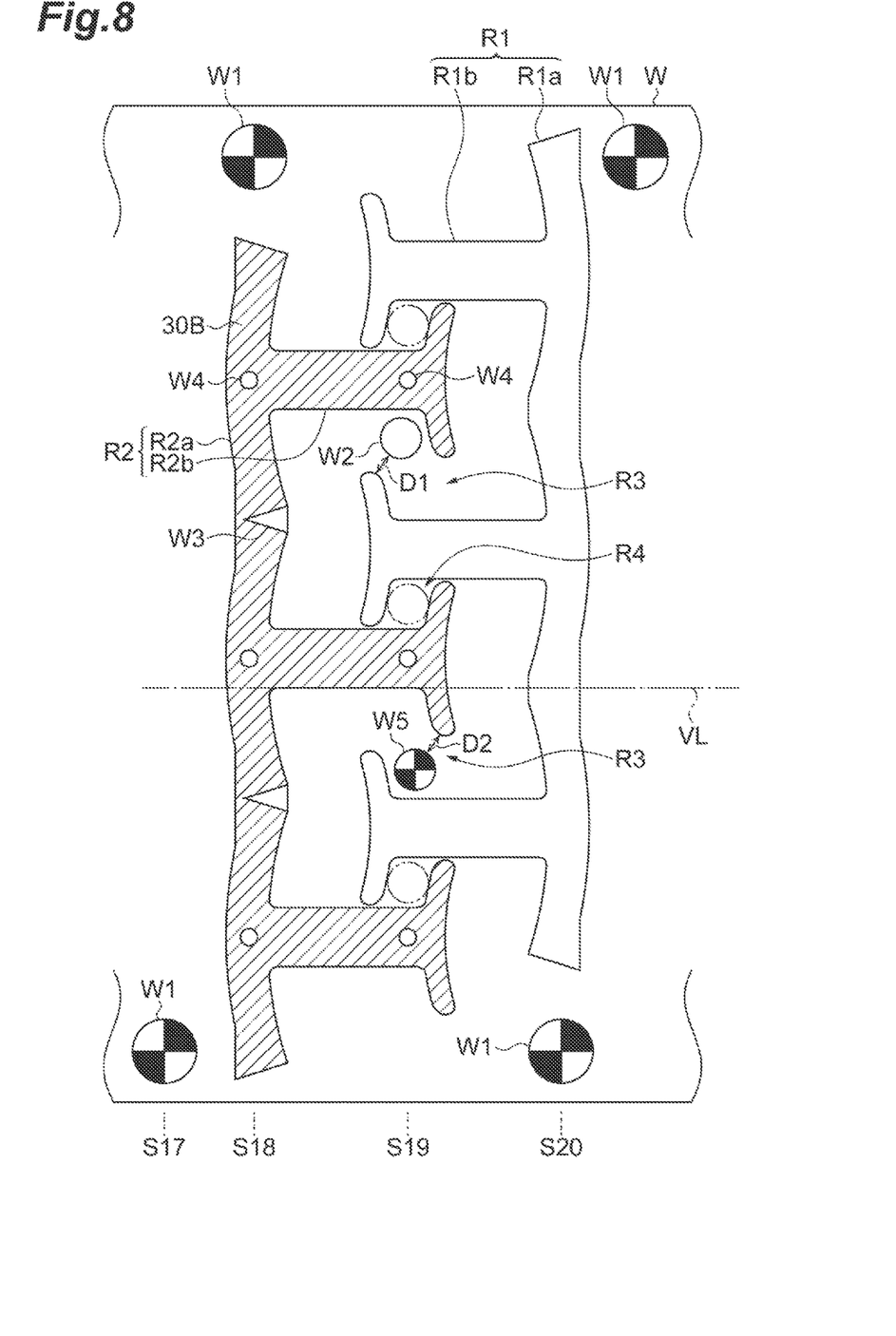
FIG. 8 is a diagram illustrating FIG. 7 in a simplified manner.

Here, by referring to FIGS. 7 and 8, the blanking shapes R1 and R2 will be described in more detail. The blanking shape R1 has a yoke corresponding region R1a (first-yoke corresponding region) corresponding to the yoke portion 2 and a plurality of teeth corresponding regions R1b (first-teeth corresponding regions) corresponding to the plurality of teeth portions 3. The yoke corresponding region R1a extends in the width direction of the electromagnetic steel sheet W and is located on the downstream side from the plurality of teeth corresponding regions R1b. The blanking shape R2 has a yoke corresponding region R2a (second-yoke corresponding region) corresponding to the yoke portion 2 and a plurality of teeth corresponding regions R2b (second-teeth corresponding regions) corresponding to the plurality of teeth portions 3. The yoke corresponding region R2a extends in the width direction of the electromagnetic steel sheet W and is located on the upstream side from the plurality of teeth corresponding regions R2b.

At the position S18 where the both blanking shapes R1 and R2 are formed in the electromagnetic steel sheet W, each one of the plurality of teeth corresponding regions R2b are located between adjacent pairs of the plurality of teeth corresponding regions R1b in the width direction of the electromagnetic steel sheet W. Assuming a virtual straight line VL (see FIG. 8) extending in the longitudinal direction of the electromagnetic steel sheet W and also passing between the one teeth corresponding region R1b (the teeth corresponding region R1b located at a center in FIG. 8, for example) and another teeth corresponding region R1b (the teeth corresponding region R1b located on a lower side in FIG. 8, for example) adjacent to each other in the width direction of the electromagnetic steel sheet \V in the plurality of teeth corresponding regions R1b, the teeth corresponding region R2b is located closer to the one teeth corresponding region R1b (the teeth corresponding region R1b located at the center in FIG. 8, for example) than the virtual straight line VL. Thus, the one teeth corresponding region R1b and the teeth corresponding region R2b are brought close to each other, while another teeth corresponding region. R1b and the teeth corresponding region R2b are separated away from each other. Therefore, a margin region R3 between the other teeth corresponding region R1b and the teeth corresponding region R2b in the electromagnetic steel sheet W becomes relatively large. On the other hand, a margin region R4 between the one teeth corresponding region R1b and the teeth corresponding region R2b in the electromagnetic steel sheet W becomes relatively small. Thus, the through holes W2 and W5 through which the pressing pins are inserted tend to be set more easily in the margin region R3, while it tends to be difficult to set a through hole through which the pressing pin is inserted in the margin region R4 (see a circle drawn by a two-dot chain line in FIG. 8).

The through holes W2 and W5 are located in the margin region R3 between the other teeth corresponding region R1b and the teeth corresponding region R2b in the electromagnetic steel sheet W. The through holes W2 and W5 are aligned in the width direction of the electromagnetic steel sheet W. The through holes W2 and W5 are located by being shifted in the longitudinal direction of the electromagnetic steel sheet W.

The through hole W2 is located closer to the teeth corresponding region R2b than the teeth corresponding region R1b. A linear distance D1 between the through hole W2 and the teeth corresponding region R1b may be 1 mm or more. The linear distance D1 between the through hole W2 and the teeth corresponding region R1b may be twice or more of a thickness of the electromagnetic steel sheet W. The through hole W5 is located closer to the teeth corresponding region R1b than the teeth corresponding region R2b. A linear distance D2 between the through hole W5 and the teeth corresponding region R2b may be 1 mm or more. The linear distance D2 between the through hole W5 and the teeth corresponding region R2b may be twice or more of a thickness of the electromagnetic steel sheet W.

[Operation]

Figure 10:
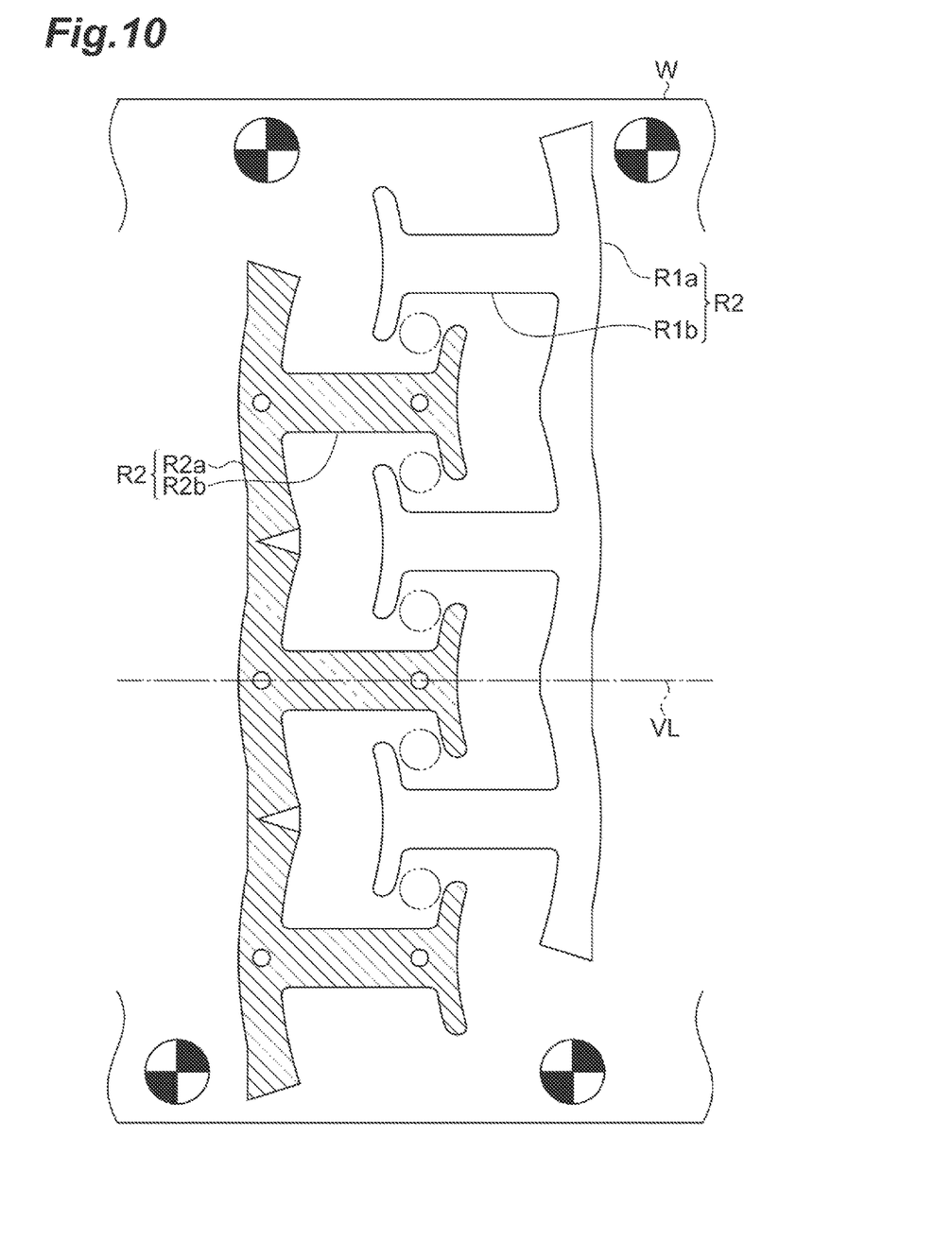
FIG. 10 is a diagram illustrating an example of a layout of a conventional blanking in a simplified manner.

In this embodiment as above, each one of the plurality of teeth corresponding regions R2b is located between adjacent pairs of the plurality of teeth corresponding regions R1b in the width direction of the electromagnetic steel sheet W. Moreover, in this embodiment, the teeth corresponding region R2b is located closer to the one teeth corresponding region R1b (the teeth corresponding region R1b located at the center in FIG. 8, for example) than the virtual straight line VL. Thus, the teeth corresponding region R1b and the teeth corresponding region R2b are brought close to each other in the width direction of the electromagnetic steel sheet W. Therefore, as illustrated in FIG. 10, as compared with the manufacturing methods of Japanese Unexamined Patent Publication No. 2003-235187 and Japanese Patent No. 5719979 in which the teeth corresponding region R2b is located on the virtual straight line VL, the electromagnetic steel sheet W with a narrower width can be used, and improvement of yield can be achieved. As a result, a manufacturing cost of the laminated stator core 1 can be reduced. Particularly, an entire length of the single coil material 11a fed out of the uncoiler 11 is approximately several 100 m to several 10000 m in some cases, for example, the electromagnetic steel sheet W with a narrower-width can achieve improvement of the yield and cost reduction extremely effectively.

In this embodiment, the through hole W5 is located in the margin region R3 between the other teeth corresponding region R1b and the teeth corresponding region R2b in the electromagnetic steel sheet W. Thus, the through hole W5 through which the pressing pin for pressing the electromagnetic steel sheet W is inserted when the blanking member 30B is to be blanked from the electromagnetic steel sheet W can be set in the margin region R3. Therefore, since rattling of the electromagnetic steel sheet W can be suppressed, the blanking member 30B can be formed accurately and stably.

In this embodiment, the through hole W5 is located closer to the teeth corresponding region R1b than the teeth corresponding region R2b. Thus, the through hole W5 is located closer to another teeth corresponding region R1b after the blanking member 30A has been already blanked. Therefore, a distance between the pressing pin inserted into the through hole W5 and the punch A9 for blanking the blanking member 30B increases. As a result, since the electromagnetic steel sheet W is pressed by the pressing pin more reliably, the blanking member 30B can be formed more accurately and more stably.

In this embodiment, the number of the through holes W5 formed by the punch A6 is larger than the number of through holes W2 formed by the punch A2. As the blanking of the electromagnetic steel sheet W progresses, rigidity of the electromagnetic steel sheet W lowers, but if the number of the through holes W5 is larger than the number of through holes W2, and if the punch A9 blanks the blanking member 30B while the pressing pin B10 presses the through hole W5 after the punch A5 blanks the blanking member 30A while the pressing pin B2 presses the through hole W2, rattling of the electromagnetic steel sheet W when the punch A9 forms the blanking member 30B is further suppressed. Thus, the blanking member 30B can be formed by the punch A9 more accurately and stably.

In this embodiment, the through holes W2 and W5 are located by being shifted in the longitudinal direction of the electromagnetic steel sheet W. Thus, the linear distance between the through hole W5 and the blanking shape R2 can be set larger more easily and the linear distance between the through hole W2 and the blanking shape R1 can be set larger more easily.

Other Embodiments

The embodiment according to this disclosure has been described above in detail, but various variations can be added to the aforementioned embodiment within a range of the gist of the present invention. For example, depending on the width of the electromagnetic steel sheet W, the through holes W2 and W5 may not have to be formed in the electromagnetic steel sheet W.

The through holes W2 and W5 may be set at arbitrary positions in the margin region R3.

The through holes W2 and W5 may align in a single row without being shifted in the longitudinal direction of the electromagnetic steel sheet W.

In this embodiment, first, the blanking member 30A is formed along the blanking shape R1 in which the yoke corresponding region R1a is located on the downstream side from the plurality of teeth corresponding regions R1b and then, the blanking member 30B is formed along the blanking shape R2 in which the yoke corresponding region R2a is located on the upstream side from the plurality of teeth corresponding regions R2b, but the blanking member 30B may be formed along the blanking shape R2 first, and then the blanking member 30A may be formed along the blanking shape R1.

The number of the through holes W5 formed by the punch A6 may be equal to the number of the through holes W2 formed by the punch A2 or may be smaller than the number of the through holes W2 formed by the punch A2.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

What is claimed is:

1. A manufacturing method of a laminated core, comprising:
   (a) forming a first blanking member by blanking a band-shaped metal plate along a predetermined first blanking shape, the first blanking member having a first yoke portion extending in a width direction of the metal plate and a plurality of first teeth portions protruding in a longitudinal direction of the metal plate from the first yoke portion and aligned in a single row at a predetermined interval in the width direction, and
   (b) forming a second blanking member by blanking the metal plate along a predetermined second blanking shape, the second blanking member having a second yoke portion extending in the width direction and a plurality of second teeth portions protruding in the longitudinal direction from the second yoke portion and aligned in a single row at a predetermined interval in the width direction,
   wherein the first blanking shape has a first-yoke corresponding region corresponding to the first yoke portion and a plurality of first-teeth corresponding regions corresponding to the plurality of first teeth portions;
   wherein the second blanking shape has a second-yoke corresponding region corresponding to the second yoke portion and a plurality of second-teeth corresponding regions corresponding to the plurality of second teeth portions; and
   wherein, in step (b), the second blanking shape is set so that each one of the plurality of second-teeth corresponding regions are located between adjacent pairs of the plurality of first-teeth corresponding regions, and the second teeth-corresponding region is located closer to one of the adjacent pairs of the plurality of first-teeth corresponding region than a virtual straight line, the virtual straight line extending in the longitudinal direction and passing between the one of the adjacent pairs of the plurality of first-teeth corresponding region and the other of the adjacent pairs of the plurality of first-teeth corresponding region.

2. The manufacturing method of a laminated core according to claim 1,
   further comprising (c) forming a first through hole by blanking the metal plate along a predetermined third blanking shape before step (b), a pressing pin pressing the metal plate is inserted through the first through hole when the second blanking member is to be blanked from the metal plate in step (b),
   wherein the first through hole is located between the other first-teeth corresponding region and the second-teeth corresponding region.

3. The manufacturing method of a laminated core according to claim 2, wherein the first through hole is located closer to the other first-teeth corresponding region than the second-teeth corresponding region.

4. The manufacturing method of a laminated core according to claim 2, wherein
a linear distance between the first through hole and the second-teeth corresponding region is 1 mm or more.

5. The manufacturing method of a laminated core according to claim 2, wherein
a linear distance between the first through hole and the second-teeth corresponding region is twice or more of a thickness of the metal plate.

6. The manufacturing method of a laminated core according to claim 2,
further comprising (d) forming a second through hole by blanking the metal plate along a predetermined fourth blanking shape before step (a), a pressing pin pressing the metal plate being inserted through the second through hole when the first blanking member is to be blanked from the metal plate in step (a),
wherein in step (c), the first through holes are formed more than the second through holes.

7. The manufacturing method of a laminated core according to claim 6, wherein in step (c), the first through hole is formed at a position aligned with the second through hole in the width direction and is shifted from the second through hole in the longitudinal direction.

8. A manufacturing device of a laminated core, comprising:
a first punch portion forming a first blanking member by blanking a band-shaped metal plate along a predetermined first blanking shape, the first blanking member having a first yoke portion extending in the width direction of the metal plate and a plurality of first teeth portions protruding in the longitudinal direction of the metal plate from the first yoke portion and aligned in a single row at a predetermined interval in the width direction; and
a second punch portion forming a second blanking member by blanking the metal plate along a predetermined second blanking shape, the second blanking member having a second yoke portion extending in the width direction and a plurality of second teeth portions protruding in the longitudinal direction from the second yoke portion and aligned in a single row at a predetermined interval in the width direction,
wherein the first blanking shape has a first-yoke corresponding region corresponding to the first yoke portion and a plurality of first-teeth corresponding regions corresponding to the plurality of first teeth portions;
wherein the second blanking shape has a second-yoke corresponding region corresponding to the second yoke portion and a plurality of second-teeth corresponding regions corresponding to the plurality of second teeth portions, and
wherein the second blanking shape is set so that each one of the plurality of second-teeth corresponding regions are located between adjacent pairs of the plurality of first-teeth corresponding regions, and the second teeth-corresponding region is located closer to one of the adjacent pairs of the plurality of first-teeth corresponding region than a virtual straight line, the virtual straight line extending in the longitudinal direction and passing between the one of the adjacent pairs of the plurality of first-teeth corresponding region and the other of the adjacent pairs of the plurality of first-teeth corresponding region.

9. The manufacturing device of a laminated core according to claim 8, further comprising:
a first pressing pin pressing the metal plate when the second blanking member is to be blanked by the second punch portion from the metal plate; and
a third punch portion forming a first through hole by blanking the metal plate along a predetermined third blanking shape, the first pressing pin being inserted through the first through hole,
wherein the third punch portion forms the first through hole so as to be located between the other first-teeth corresponding region and the second-teeth corresponding region.

10. The manufacturing device of a laminated core according to claim 9, wherein the third punch portion forms the first through hole so as to be located closer to the other first-teeth corresponding region than the second-teeth corresponding region.

11. The manufacturing device of a laminated core according to claim 9, wherein a linear distance between the first through hole and the second-teeth corresponding region is 1 mm or more.

12. The manufacturing device of a laminated core according to claim 9, wherein a linear distance between the first through hole and the second-teeth corresponding region is twice or more of a thickness of the metal plate.

13. The manufacturing device of a laminated core according to claim 9, further comprising:
a second pressing pin pressing the metal plate when the first punch portion blanks the first blanking member from the metal plate; and
a fourth punch portion forming a second through hole by blanking the metal plate along a predetermined fourth blanking shape, the second pressing pin being inserted through the second through hole,
wherein the third punch portion forms the first through holes more than the second through holes formed by the fourth punch portion.

14. The manufacturing device of a laminated core according to claim 13, wherein the fourth punch portion forms the second through hole at a position aligned with the first through hole in the width direction and shifted from the first through hole in the longitudinal direction.

\* \* \* \* \*